United States Patent
Jung et al.

(10) Patent No.: US 7,624,129 B2
(45) Date of Patent: Nov. 24, 2009

(54) DUAL LOGGING OF CHANGES TO A USER PREFERENCE IN A COMPUTER DEVICE

(75) Inventors: Kenneth M Jung, Kirkland, WA (US); Dragos C Sambotin, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 341 days.

(21) Appl. No.: 11/480,628

(22) Filed: Jun. 30, 2006

(65) Prior Publication Data

US 2008/0005192 A1    Jan. 3, 2008

(51) Int. Cl.
*G06F 17/30* (2006.01)
(52) U.S. Cl. .................................................. 707/202
(58) Field of Classification Search ................ None
See application file for complete search history.

(56) References Cited

U.S. PATENT DOCUMENTS

| | | | |
|---|---|---|---|
| 4,878,167 A | | 10/1989 | Kapulka et al. |
| 5,307,497 A | * | 4/1994 | Feigenbaum et al. ........... 713/1 |
| 5,577,222 A | * | 11/1996 | Micka et al. ................. 711/112 |
| 5,745,686 A | * | 4/1998 | Saito et al. .................. 717/168 |
| 5,828,821 A | | 10/1998 | Hoshina et al. |
| 6,321,234 B1 | | 11/2001 | Debrunner |
| 6,732,124 B1 | * | 5/2004 | Koseki et al. ................ 707/202 |
| 6,751,606 B1 | * | 6/2004 | Fries et al. ...................... 707/3 |
| 7,035,964 B1 | * | 4/2006 | Kohler et al. ................ 711/103 |
| 2003/0135524 A1 | * | 7/2003 | Cane et al. ................... 707/204 |
| 2004/0030703 A1 | | 2/2004 | Bourbonnais et al. |
| 2004/0045016 A1 | * | 3/2004 | Romm et al. ................ 719/328 |

OTHER PUBLICATIONS

Chong, Raul, An Introduction to DB2 for OS/390 and z/OS System Structures for DB2 Distributed Users, Jul. 18, 2002, http://web.archive.org/web/20040804191200/www-106.ibm.com/developerworks/db2/library/techarticle/0207chong/0207chong.html.*
Gu, L., et al., "DB2 UDB Backup and Recovery with ESS Copy Services," *IBM Redbooks*, Aug. 15, 2002, pp. 1-126.
Kyne, F., and G. McGeoch, "Achieving the Highest Levels of Parallel Sysplex Availability for DB2," *IBM Redbooks*, Dec. 29, 2004, pp. 1-44.
Wang, Y.-M., et al., "Persistent-state Checkpoint Comparison for Troubleshooting Configuration Failure," *Proceedings of the 2003 International Conference on Dependable Systems and Networks*, San Francisco, California, Jun. 2003, pp. 311-318.

* cited by examiner

*Primary Examiner*—John R. Cottingham
*Assistant Examiner*—Nicholas E Allen
(74) *Attorney, Agent, or Firm*—Wolf, Greenfield & Sacks, P.C.

(57) ABSTRACT

A computer device for logging changes to a user preference includes two log files, and a first and second file. The changes are written to the first file. The changes are then flushed to the log file with a marker. The marker is moved to the other log file before the changes are written to the second file. If the changes are successfully written, the changes are loaded from the second file into short term memory (RAM). If there is a transient error but there are no more changes after the error, the changes flushed to the log file are loaded into RAM. If the transient error occurs and there are further changes, all changes (before and after the error) are flushed to the log file with the marker, after which the marker is moved to the other log file before the changes are written to the second file.

19 Claims, 12 Drawing Sheets

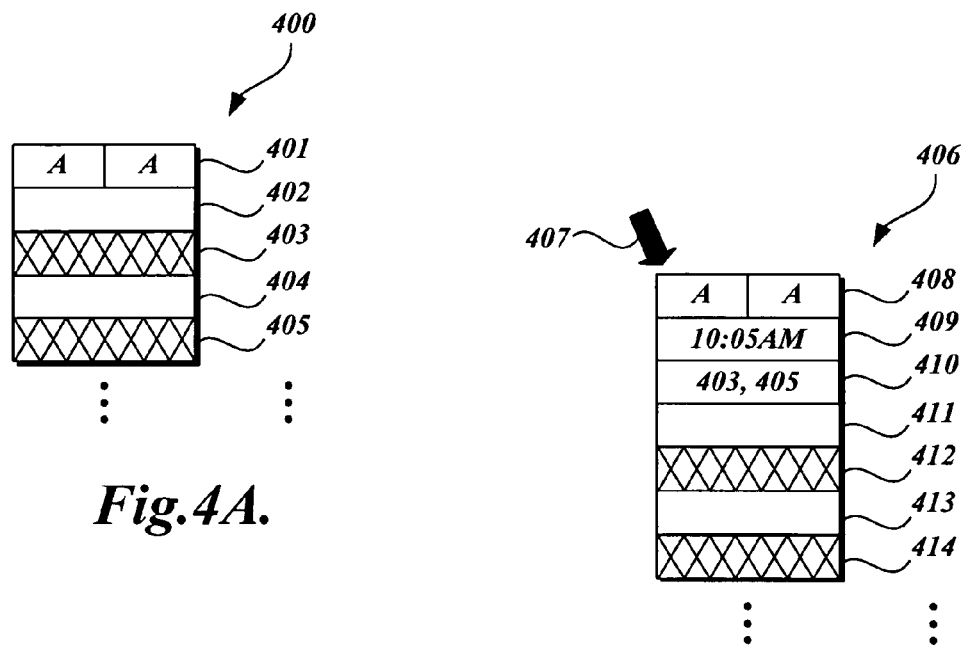
*Fig.4A.*
*Fig.4B.*
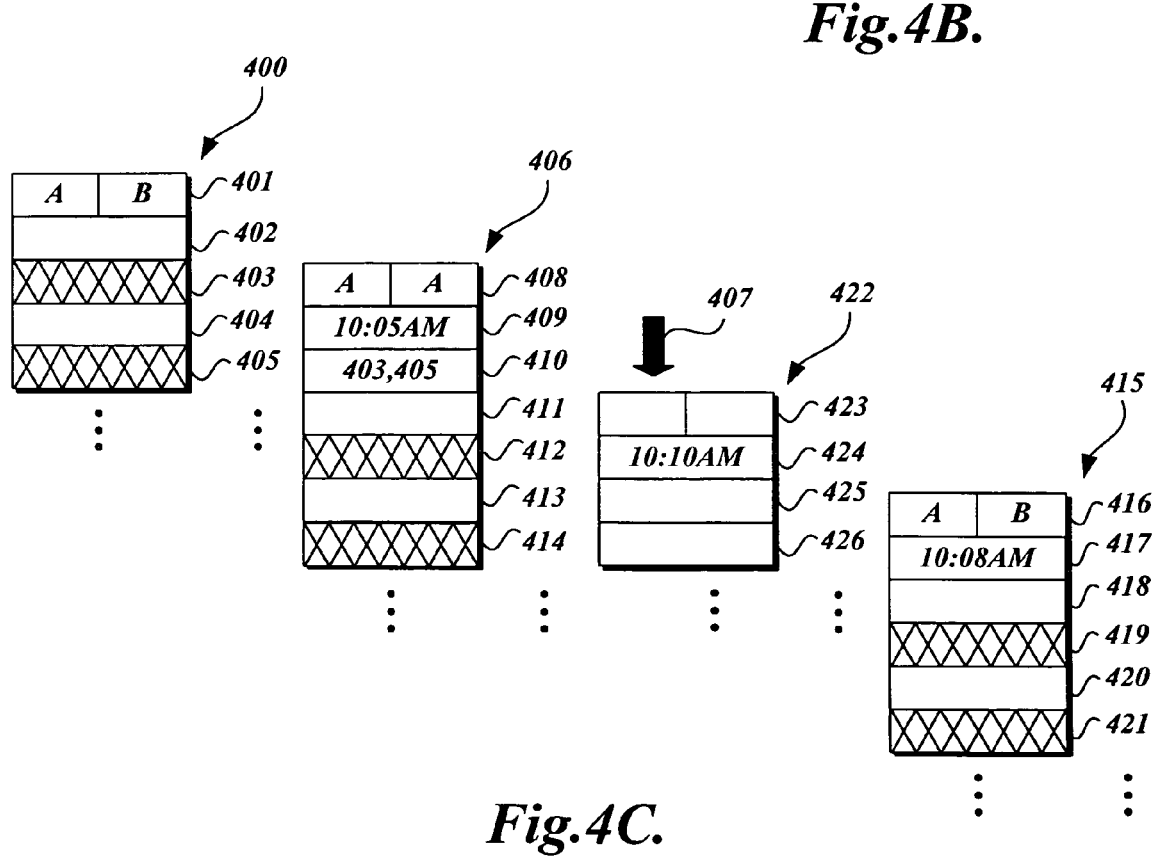
*Fig.4C.*

DUAL LOGGING OF CHANGES TO A USER PREFERENCE IN A COMPUTER DEVICE

BACKGROUND

Current computer device operating systems store configuration data in a configuration file located in long term, frequently called permanent, memory. Computer devices include, but are not limited to, desktop and laptop personal computer, personal digital assistant (PDA), cellular telephone, etc. Configuration data includes file associations, hardware, operating system and installed application settings, display, printer, and other connected peripheral settings, performance data, etc. (collectively, hereinafter "user preference"). When changes are made to the user preference, the changes (or dirty data) are written in a configuration file in a computer device memory located in short-term memory, frequently called Random Access Memory (RAM).

At regular time intervals, the dirty data is flushed from the short term memory to a log file located in long term memory before the dirty data is written to the configuration file located in long term memory. Long term memory includes the hard drive of a desktop or laptop computer or the flash memory of a PDA or cellular telephone, for example.

Every time the computer device is turned on, the operating system loads the user preference stored in the configuration file located in long term memory into short term memory for applications to execute according to the changes made to the user preference. For example, in a computer device that includes a Windows® type operating system, a configuration file stored on a hard disk is called a hive primary file (hereinafter HPF), a configuration file stored in memory, e.g., RAM, is called a registry hive file or an in-memory hive file (hereinafter, HMF), and a log file stored on the hard disk is called a hive log file (hereinafter, HLF). Accordingly, when user preference changes are made, the changes are written to the HMF before the changes are flushed from the HMF to the HLF and subsequently written from the HMF to the HPF. Windows® loads the contents of the HPF into RAM for applications to execute according to the changes made to the user preference. Maintaining the user preference stored in the configuration file on the hard disk (i.e., the HPF) current as user preference changes are made is critical if applications are to execute according to the latest changes made to the user preference. The user preference stored in the configuration file on the hard disk (i.e., the HPF) may not be current, i.e., may not include changes made to the user preference if a computer device "crashes" or a transient error occurs while writing from the configuration file in memory (i.e., the HMF) to the configuration file on the hard disk, (i.e., the HPF). Since the configuration file in memory, the HMF, is deleted when the computer device is shut down, as usually occurs when a computer device "crashes", the "dirty data" stored in the log file, i.e., the HLF, is loaded into memory when the computer device is turned on the next time. Dirty data comprises changes made to the user preference not yet transferred to the HPF. In the case of a transient error, while changes to the user preference continue to be written to the configuration file in memory (which is deleted when the computer device is shut down), the operating system prevents the dirty data from being written to the configuration file on the hard disk or flushed to the log file. As a result, the incomplete dirty data in the log file is loaded into memory when the computer device is next turned on.

FIGS. 1A and 1B form a flow diagram 100 illustrating an exemplary sequence of events that might occur when changes are made to a user preference. The changes may be either successfully or unsuccessfully written to a configuration file on a hard disk of a computer device, depending on whether a crash or transient error occurs. While FIGS. 1A and 1B illustrate exemplary sequence of events in the computer device operating a Windows® operating system, it is to be understood that the similar events may occur in computer devices controlled by other types of operating systems. Flow diagram 100 begins at block 101 when a change is made to a user preference. The change, called dirty data, is written to a registry hive file (HMFo) at block 102.

FIG. 2A is a pictorial illustration of an exemplary prior art HMFo 200. HMFo 200 includes a header section 201 subdivided into two, where each subdivision holds an integer. The integers match (illustrated by "A" in each subdivision) before dirty data is written to one or more data sections 202, 203, 204, . . . of the HMFo 200. The integers remain matched until the dirty data is flushed to a hive log file (not shown). When the dirty data is flushed to a hive log file, the integers become mismatched. Mismatching occurs before the dirty data is written to the hive primary file (not shown). The data sections 202, 203, 204, . . . of HMFo, shown below the header section 201, change in size and number depending on the amount of dirty data to be written to HMFo 200. In the example shown in FIG. 2A, two of the data sections 203 and 204 contain dirty data, as illustrated by a sequence of "Xs." The other illustrated data section 202 includes clean or unchanged data. It is to be understood that each data section could contain dirty data for more than one user preference or the dirty data for one user preference could overflow from one data section into another.

Returning to FIG. 1A, at block 103, a check is made to determine if a flush operation to flush the HMFo is either initiated by a user or a "lazy flush" has been initiated. If the check fails (the "NO" branch from block 103), a further check is made at block 104 to determine if there is more dirty data to be written to the HMFo data sections. If the further check fails (the "NO" branch from block 104), the flow cycles back to block 103. If the further check succeeds (the "YES" branch from block 104), the flow cycles back to block 102. If the check at block 103 succeeds (the "YES" branch from block 103), at block 105, the header section of HMFo is written to a header section of a hive log file (HLFo). Next, at block 106, a dirty vector is written in HLFo. Next, at block 107, the dirty data is written from HMFo to corresponding data sections of HLFo.

FIG. 2B is a pictorial illustration of an exemplary prior art HLFo 205. HLFo 205 includes a header section 206 subdivided into two. The header section 206 contains an "A" in each subdivision (written at block 105 in FIG. 1A). Below the header section 206 is a dirty vector section 207. The dirty vector section 207 contains location information for the dirty data in the data sections of HMFo 200 that contain dirty data, namely, sections 203 and 204. Comparing FIG. 2A with FIG. 2B reveals that the location information for the dirty data in sections 203 and 204 is written at block 106 in FIG. 1A, into the dirty vector section 207 of HLFo 205.

HLFo 205 also includes data sections 208, 209, 210, . . . shown as located below the dirty vector section 207. Similar to HMFo 200, the data sections of HLFo 205 change in size and number depending on the amount of dirty data to be written from HMFo 200 to HLFo 205. In this example, data sections 209 and 210 of HLFo 205 contain dirty data written from data sections 203 and 204, respectively, of HMFo 200. The dirty data (written at block 107 in FIG. 1A) is represented by a sequence of "Xs".

Returning to FIG. 1A, at block 108, a check is made to determine if the dirty data needs to be written from HMFo to a hive primary file (HPFo). As illustrated in FIG. 2C and described below, the structure of HPFo is similar to the structure of HMFo. In other words, HPFo includes a header section subdivided into two, each subdivision holding an integer, and data sections corresponding in size and number to the data sections of HMFo. If the check fails (the "NO" branch from block 108 in FIG. 1A), the flow continuously cycles back to block 108 until the check succeeds. When the check succeeds (the "YES" branch from block 108), at block 109 (FIG. 1B), the header section of HMFo becomes mismatched. Next, at block 110, the mismatched header section of HMFo is written to the header section of HPFo. Next, at block 111, the dirty data is written from the data sections of HMFo to corresponding data sections of HPFo.

FIG. 2C is a pictorial illustration of the status of an exemplary prior art, HMFo 200, HLFo 205 and HPFo 211. HMFo 200 and HLFo 205 are the same as in FIGS. 2A and 2B, respectively, with some changes in the header section of HMFo 200. More specifically, HMFo 200 of FIG. 2C contains a mismatched header section 201 (illustrated by "A" and "B" in the two subdivisions that become mismatches at block 109 of FIG. 1B). The header, vector, and data sections of HLFo 205 remain the same as at the end of block 107 in FIG. 1A. HPFo 211 includes a mismatched header section 212 (illustrated by "A" and "B" in each of the two subdivisions as written at block 110 in FIG. 1B). HPFo 211 further includes data sections 213, 214, 215, . . . illustrated as located below the header section 212. Data sections 214 and 215 contain dirty data (illustrated by a sequence of Xs) written at block 111 in FIG. 1B. The dirty data in sections 214 and 215 of HPFo 211 correspond to the dirty data in sections 203 and 204, respectively, of HMFo 200.

Returning to FIG. 1B, at block 112, if a check determines that the computer device has not "crashed" or a transient error has not occurred before all of the dirty data is written from HMFo to HPFo (the "NO" branch from block 112), at block 117 the header section of HPFo is matched.

FIG. 2D is a pictorial illustration of the status of the exemplary prior art HMFo 200, HLFo 205 and HPFo 211 showing the header section matching that occurs at block 117 of FIG. 1B. These two subdivisions of the header sections of HMFo 200 and HLFo 205 remain the same as in FIG. 2C. The two subdivisions of the header section 212 of HPFo becomes matched (as illustrated by "A" in both subdivisions).

Returning to FIG. 1B, at block 118, since the dirty data is successfully written to HPFo, the user preference from HPFo is loaded into memory when the computer device is turned on the next time, and the flow cycles back to block 101.

If the computer crashes before all of the dirty data is written from HMFo to HPFo (the "YES IF CRASH" branch from block 112), at block 114, the user preference from HLFo is loaded into memory when the computer device is turned on the next time. The flow cycles back to block 101. If a transient error occurs before all of the dirty data is written from HMFo to HPFo (the "YES IF TE" branch from block 112), a further check is made at block 113 to determine if HMFo needs flushing. More specifically, the further check is made to determine if the user has made further changes to the user preference written to HMFo since the last flush operation at block 103. If the further check fails (the "NO" branch from block 113), no more dirty data was written to HMFo after the last flush operation. In this situation, even though the transient error occurred before all of the dirty data was written to HPFo, the dirty data in HLFo is valid. If the further check fails, at block 114, the user preference from HLFo is loaded into memory when the computer device is turned on the next time. The flow cycles back to block 101.

FIG. 2E is a pictorial illustration of the status of the exemplary prior art HMFo 200, HLFo 205 and HPFo 211 at block 114 in FIG. 1B if the further check fails or the computer device "crashes" before all of the dirty data is written. HMFo 200 and HLFo 205 remain the same as in FIGS. 2C and 2D. In addition to HPFo 211 containing a mismatched header section 212 (illustrated by "A" and "B" in each of the two subdivisions), one of the data sections 215 of HPFo 211 contains incomplete dirty data (illustrated by a sequence of Xs in data section 215 that is less than the sequence of Xs in data section 204 of HMFo 200).

Returning to FIG. 1B, if the further check succeeds (the "YES" branch from block 113), additional dirty data was written to HMFo after the last flush operation. In this case, at block 115, the dirty data written to HMFo after the last flush operation at block 103 cannot be flushed to HLFo. In this case, the dirty data in HLFo is only complete up to the last flush operation. Dirty data created after the last flush, up to when the transient error occurred is not in HPFo. At block 116, the (incomplete) user preference from HLFo is loaded into memory when the computer device is next turned on. Because the user preference is not complete, the user will have to redo the changes to the user preference that occurred after the flush operation (block 103). Next, the flow cycles back to block 101.

FIG. 2F is a pictorial illustration of the status of the exemplary prior art HMFo 200, HLFo 205, and HPFo 211 at block 115 in FIG. 1B. HMFo 200 contains dirty data written in data section 202 (illustrated by a sequence of Xs) that occurs after the flush operation at block 103 in FIG. 1B. HLFo 205 remains the same as in FIGS. 2B, 2C, 2D, and 2E. HPFo 211 remains the same as in FIG. 2E above for the same reason.

Even though most current computer devices use a log file of the type generally described above to log changes made to a user preference, some systems that control several computer devices use dual copies of the log file. The dual copies are stored on two different computer devices in an effort to ensure that both copies are not impacted by a "crash" or transient error in one computer device. Since the content of the dual copies is identical before the "crash" or transient error occurs, changes made to the user preference after the "crash" or transient error cannot be written to the configuration file of the computer device experiencing the "crash" or transient error. This means that user applications running on the computer device experiencing the "crash" or transient error will not execute according to all changes made to the user preference, until a system administrator matches the dual copies of the log file.

As will be appreciated from the foregoing discussion, current operating systems that use a log file or dual copies of a log file may not always write all changes made to a user preference before a "crash" or after a transient error. Since most users are unaware of the transient error, most users will not realize that changes made to a user preference were not written until an application does not execute according to the changes made to the user preference. As a result, users are required to redo the changes made to the user preference prior to when the computer device "crashed" or the transient error occurred, that were not written to the user preference before the crash or transient error.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method for logging changes made to a user preference in a computer device is provided. The computer device includes two log files located in long term memory for logging the user preference. The computer device also includes a first configuration file located in short term memory and a second configuration file located in long term memory. When changes are made to the user preference, the changes (dirty data) are written to the first configuration file. At regular time intervals or when a user initiates a flush operation, the dirty data is flushed from the first configuration file to one of the log files. The log file to which the dirty data is flushed is marked (i.e., identified as the recipient of the flushed dirty data). The other log file (to which dirty data is not flushed) is not marked. When the dirty data is ready to be written from the first configuration file to the second configuration file, the marker is moved from the marked log file to the unmarked log file before the dirty data is written to the second configuration file. If all of the dirty data is successfully written from the first configuration file to the second configuration file, the dirty data from the second configuration file is loaded by the operating system of the computer device into RAM when the computer device is next turned on. If the computer device "crashes" before all of the dirty data is written from the first configuration file to the second configuration file, the dirty data flushed to the log file (the log file currently without the marker) is loaded by the operating system into RAM when the computer device is next turned on. If there is a transient error (an error that allows changes made to the user preference to be written to the first configuration file yet prohibits dirty data to be written to the second configuration file) before all of the dirty data is written from the first configuration file to the second configuration file, and there are no more changes made to the user preference after the last flush operation, the dirty data flushed to the log file (the log file currently without the marker) is loaded by the operating system into RAM when the computer device is next turned on. If the transient error occurs before all of the dirty data is written from the first configuration file to the second configuration file and there are changes made to the user preference after the last flush operation, all of the dirty data (changes made to the user preference before and after the transient error) is flushed to the log file with the marker at the next scheduled flush operation or if the user initiates a flush operation. When the dirty data is ready to be written from the first configuration file to the second configuration file, the marker is moved from the marked log file to the unmarked log file before the dirty data is written to the second configuration file. The dirty data written to the second configuration file is loaded by the operating system into RAM when the computer device is next turned on.

Having two log files insures that when changes are made to the user preference before a "crash" or after an transient error occurs, all of the dirty data is either flushed to one of the two log files or written to the second configuration file from where the changes can be loaded into memory when the computer device is next turned on. As a result, applications execute according to the changes made to the user preference without a user being required to redo any changes made to the user preference before a "crash" or after a transient error occurs.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein:

FIG. 4A is a pictorial illustration of an exemplary HMFn, according to the disclosed subject matter.

FIG. 4B is a pictorial illustration of an exemplary HLF1, according to the disclosed subject matter.

FIG. 4C is a pictorial illustration of the status of an exemplary HPFn and HLF2 and the status of the exemplary HMFn and HLF1 of FIGS. 4A and 4B at block 317 of FIG. 3B.

DETAILED DESCRIPTION

Figure 1A:
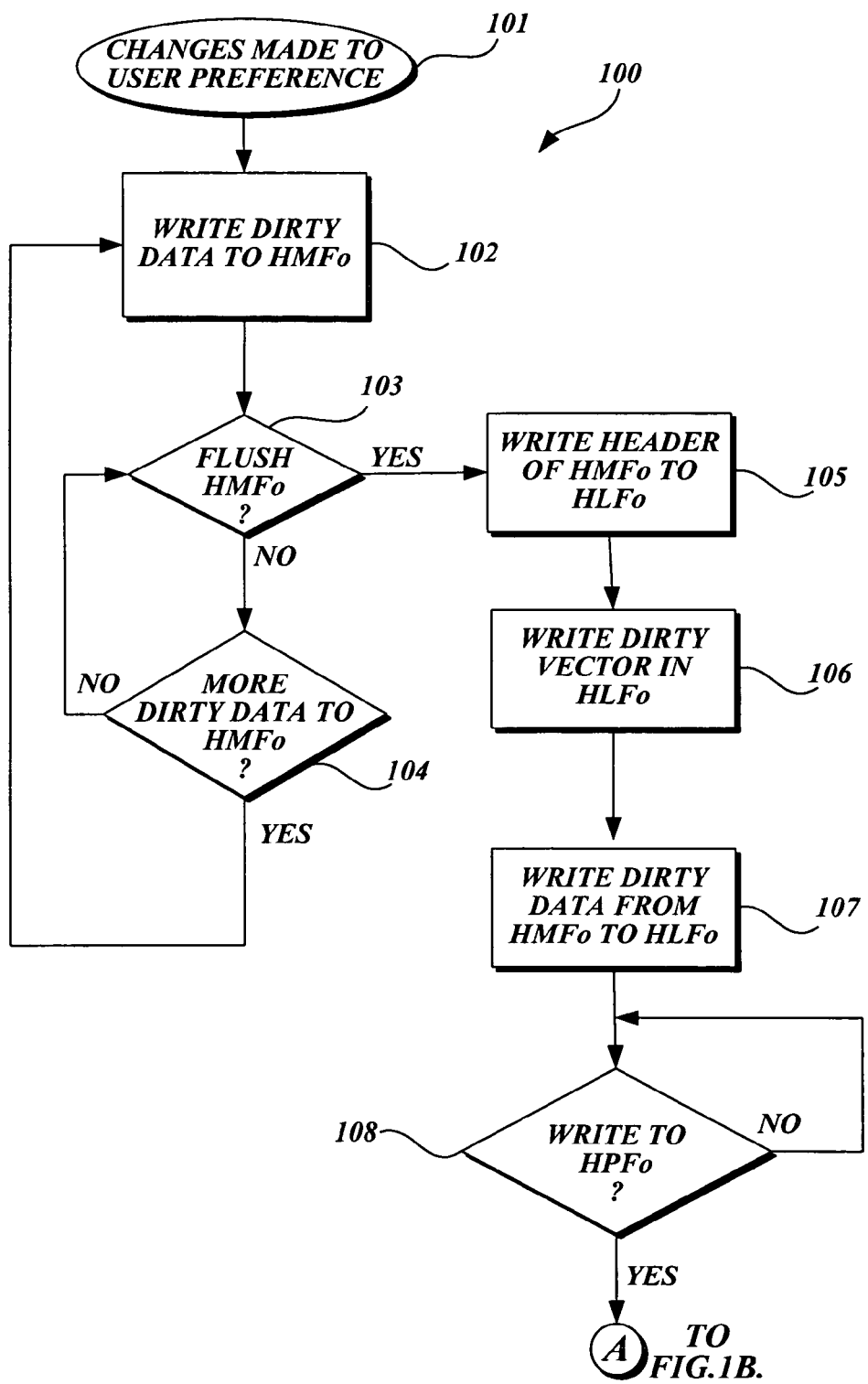
FIGS. 1A and 1B form a flow diagram that illustrates exemplary sequence of events that occur when changes are made to a user preference, in a prior art computer device.
Figure 1B:
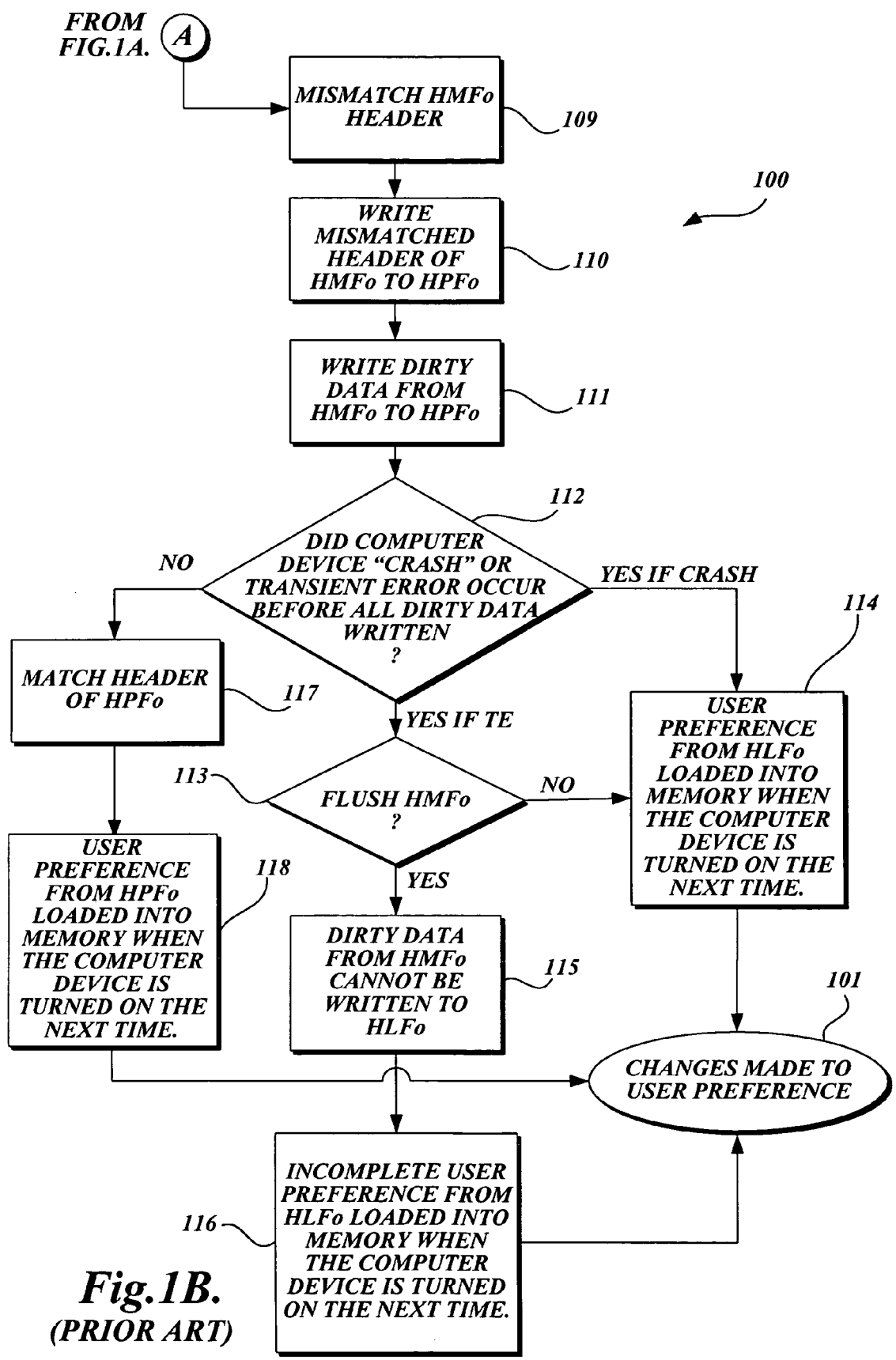
Figure 2A:
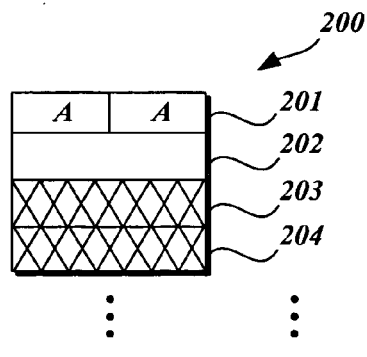
FIG. 2A is a pictorial illustration of an exemplary prior art HMFo.
Figure 2B:
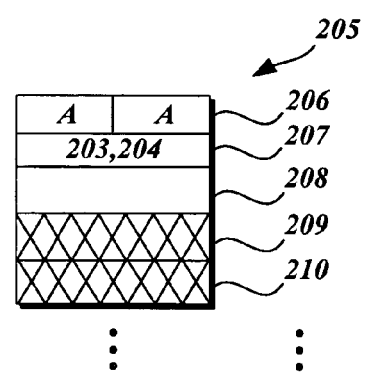
FIG. 2B is a pictorial illustration of an exemplary prior art HLFo.
Figure 2C:
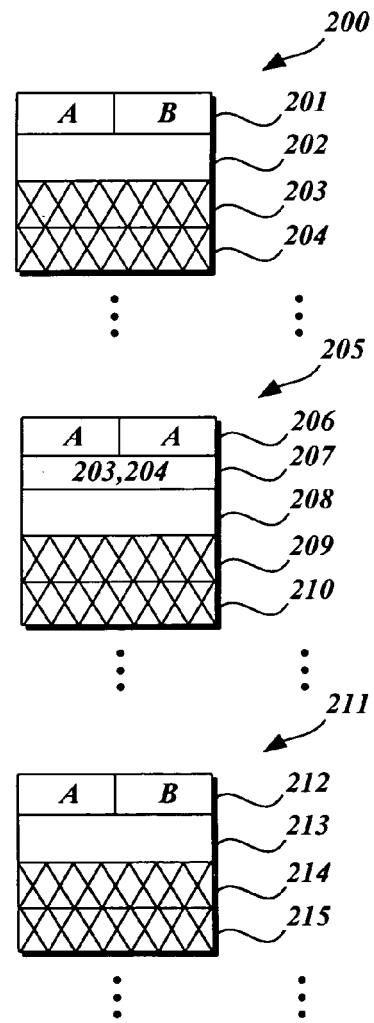
FIG. 2C is a pictorial illustration of an exemplary prior art HPFo, an exemplary prior art HMFo and an exemplary prior art HLFo.
Figure 2D:
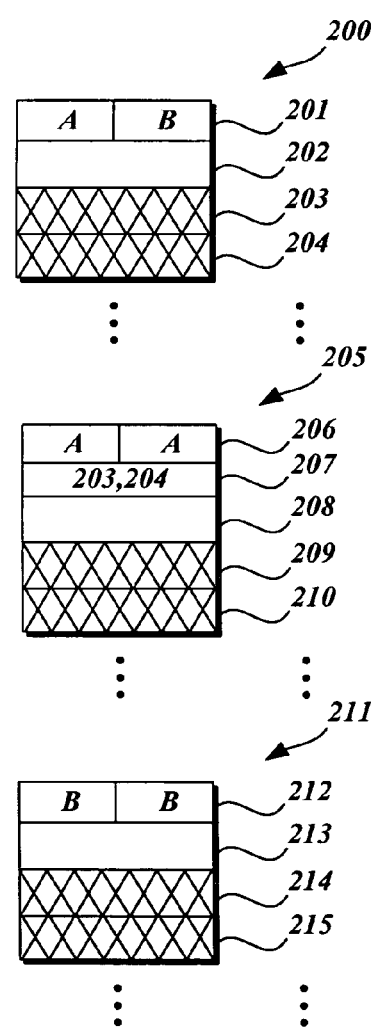
FIG. 2D is a pictorial illustration of the status of the exemplary prior art HMFo, HLFo, and HPFo of FIG. 2C at block 117 of FIG. 1B.
Figures 2E, 2F:
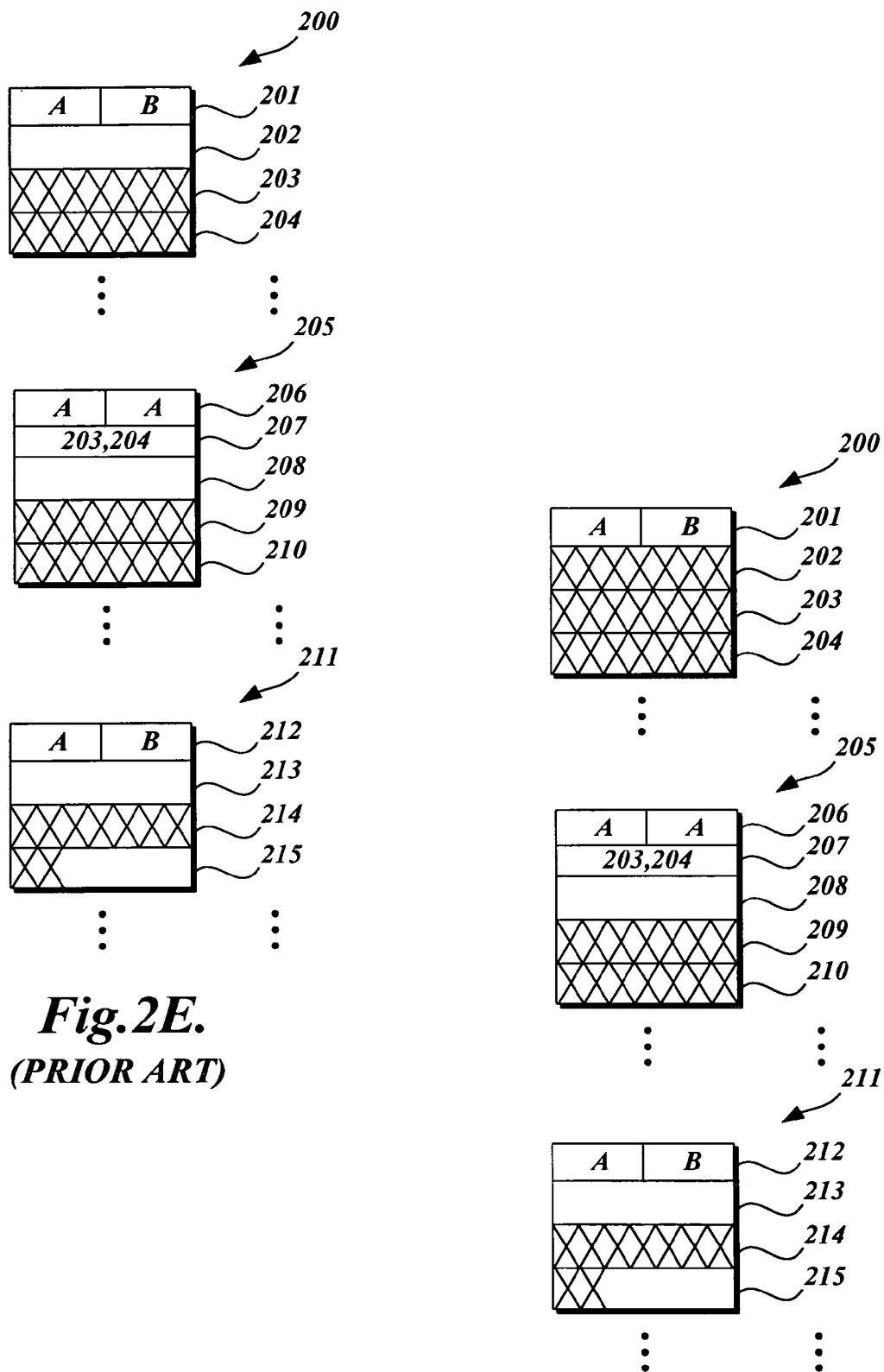
FIG. 2E is a pictorial illustration of the status of the exemplary prior art HMFo, HLFo, and HPFo of FIG. 2C at block 114 of FIG. 1B.
FIG. 2F is a pictorial illustration of the exemplary prior art HMFo, HLFo, and HPFo of FIG. 2C at block 115 of FIG. 1B.

The following description includes numerous specific details intended to provide a thorough description of exemplary embodiments of the disclosed subject matter. It will be apparent, however, to one skilled in the art that the disclosed subject matter may be practiced without these specific details. In other instances, well known features have not been described in detail so as not to obscure the disclosed subject matter.

A method for logging changes made to a user preference in a computer device is disclosed. As mentioned above, a user preference is a collection of configuration data of the computer device that includes file associations, preferences for a current user, settings for hardware, operating system and installed applications, settings for display, printers, and other peripherals connected, performance data, etc. While the disclosed subject matter is described in a computer device controlled by a Windows® type operating system, it is to be understood that this exemplary embodiment should be construed as exemplary and not limiting since the disclosed subject matter may also find use in computer devices employing other operating systems.

In accordance with the disclosed subject matter, the computer device includes two hive log files (i.e., HLFs) labeled HLF1 and HLF2 located in the long term memory, such as a hard disk, of the computer device. As more fully described below, HLF1 and HLF2 are used to log the user preference. It is to be understood that the labels HLF1 and HLF2 should be construed as illustrative and so not limiting. In this regard, the labels can be interchanged or given some other name without departing from the scope of the disclosed subject matter.

The computer device also includes an in-memory hive file (i.e., an HMF) labeled HMFn, and a hive primary file (i.e., an HPF) labeled HPFn. Again, it is to be understood that the labels HMFn and HPFn should be construed as illustrative and not as limiting. In this regard, the labels can be given some other name without departing from the scope of the disclosed subject matter. Further, as noted above, even though the disclosed subject matter is described in a computer device controlled by a Windows® type operating system, it is to be understood that the disclosed subject matter is independent of the type of operating system since the disclosed subject matter can be practiced in computer devices controlled by other types of operating systems.

FIGS. 3A-3D form a flow diagram 300 illustrating an exemplary sequence of events that occur when changes are made to a user preference, according to the disclosed subject matter. The changes are either successfully or unsuccessfully written to HPFn. Flow diagram 300 begins at block 301 of FIG. 3A when a change is made to a user preference. The change (or dirty data) is written to HMFn at block 302.

FIG. 4A is a pictorial illustration of an exemplary HMFn 400. HMFn 400 includes a header section 401 subdivided into two. Each subdivision holds an integer. The values of the integers are matched at block 305 of FIG. 3A as described below, before the dirty data is written to one of the two log files. The integers are depicted as matched in FIG. 4A by the "A" in each of the two subdivisions of the header section 401. HMFn 400 also includes a plurality of data sections 402, 403, 404, 405, . . . shown as located below the header section 401. The size and number of the data sections depends on the amount of dirty data to be written to HMFn 400. In the example shown in FIG. 4A, data sections 403 and 405 contain dirty data, as illustrated by a sequence of "Xs." It is to be understood that each data section could contain dirty data for more than one user preference or the dirty data for a user preference could overflow from one data section into another.

Returning to FIG. 3A, at block 303, a check is made to determine if an HMFn flush operation (F1) has either been initiated by a user or a "lazy flush" has occurred. If the check fails (the "NO" branch from block 303), at block 304 a further check is made to determine if there is more dirty data to be written to the data sections of HMFn. If the further check fails (the "NO" branch from block 304), the flow cycles back to block 303. If the further check succeeds (the "YES" branch from block 304), the flow cycles back to block 302. If the check at block 303 succeeds (the "YES" branch from block 103), at block 305, the header section of HMFn is matched (if not matched as a result of previous events). Next, at block 306, a marker, such as a software pointer, for example, is set on one of the two log files. For purpose of illustrating the exemplary sequence of events in FIG. 3A, HLF1 is chosen as the log file whose marker is set. Alternatively, HLF2 could have its marker set. Next, at block 307, the header section of HMFn is written to the header section of HLF1. Then, at block 308, a time stamp of the flush operation (F1) is written to a section of HLF1. The time stamp denotes the time when the flush operation (FI) occurs. Next, at block 309, a dirty vector is written in HLF1. Then, at block 310, the dirty data is written from HMFn to corresponding data sections of HLF1.

FIG. 4B is a pictorial illustration of an exemplary HLF1 406. HLF1 406 includes a marker 407 depicted as a thick arrow, that was set at block 306 of FIG. 3A. As previously noted, HLF1 406 includes a header section 408 subdivided into two. Each subdivision of the header section 408 includes the same integer identifier, represented by the "A," which was written at block 307 of FIG. 3A. Illustrated as located in a section located immediately below the header section 408 is the time stamp section 409. For purposes of illustration only, the time stamp section contains the time 10:05 μM. As previously noted, this is the time at which the flush operation (F1) (block 303 of FIG. 3A) occurred. It should be noted that the time stamp section is present in prior art hive log files (not shown or discussed in FIG. 1 and FIGS. 2B-2F for sake of simplicity).

The difference between the time stamp section of prior art hive log files and the time stamp section of HLF1 and HLF2 lies in the use of the time stamp. The time stamp in HLF1 and HLF2 is used to select the correct log file instead of validating the hive log file as in prior art computer devices. Illustrated as located below the time stamp section 409 is a dirty vector 410. Dirty vector 410 contains information that describes the location of the dirty data in the data sections of HMFn 400. More specifically, comparing FIG. 4A with FIG. 4B reveals that dirty data sections 403 and 405, written at block 309 of FIG. 3A, correspond to the location information for dirty data in data sections 403 and 405 included in the dirty vector 410. HLF1 406 further includes data sections 411, 412, 413, 414, . . . shown as located below the dirty vector 410. Similar to HMFn 400, the size and number of the data sections of HLF1 406 depends on the amount of dirty data to be written from HMFn 400. Data sections 412 and 414 contain dirty data written from data sections 403 and 405, respectively, of HMFn 400. The dirty data, illustrated by a sequence of "Xs," is written or copied at block 310 of FIG. 3A.

Returning to FIG. 3A, at block 311, a check is made to determine if the dirty data needs to be written (W1) from HMFn to data sections of HPFn. If the check fails (the "NO" branch from block 311), the flow continuously cycles back to block 311 and remains in this loop until the check succeeds. If the check succeeds (the "YES" branch from block 311), at block 312 (FIG. 3B), the two subdivisions of the header section of HMFn become mismatched. Next, at block 313, the mismatched header section of HMFn is written to the header section of HPFn. Then, at block 314, a time stamp of the write operation (W1) is written to a section of HPFn. The time stamp denotes the time when the write operation (W1) occurred. Next, at block 315 the marker is moved to HLF2. Then, at block 316 a time stamp of the marker movement (block 315) is written to a section below the header section of HLF2. The time stamp denotes the time when the marker is moved to HLF2. Next, at block 317, the dirty data is written from the data sections of HMFn to corresponding data sections of HPFn.

Figure 3A:
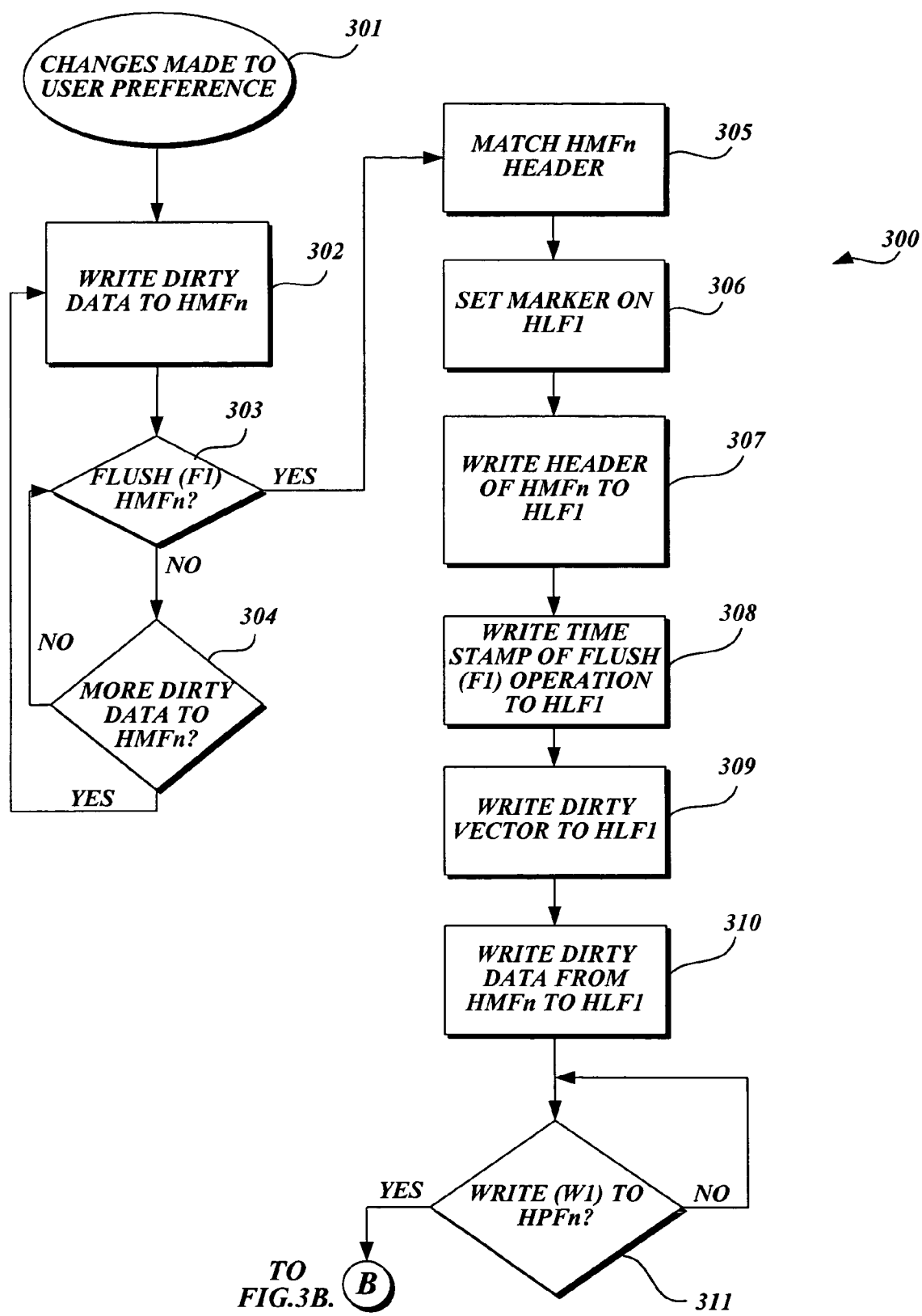
FIGS. 3A-3D form a flow diagram that illustrates an exemplary sequence of events that occur when changes are made to a user preference, according to the disclosed subject matter.
Figure 3B:
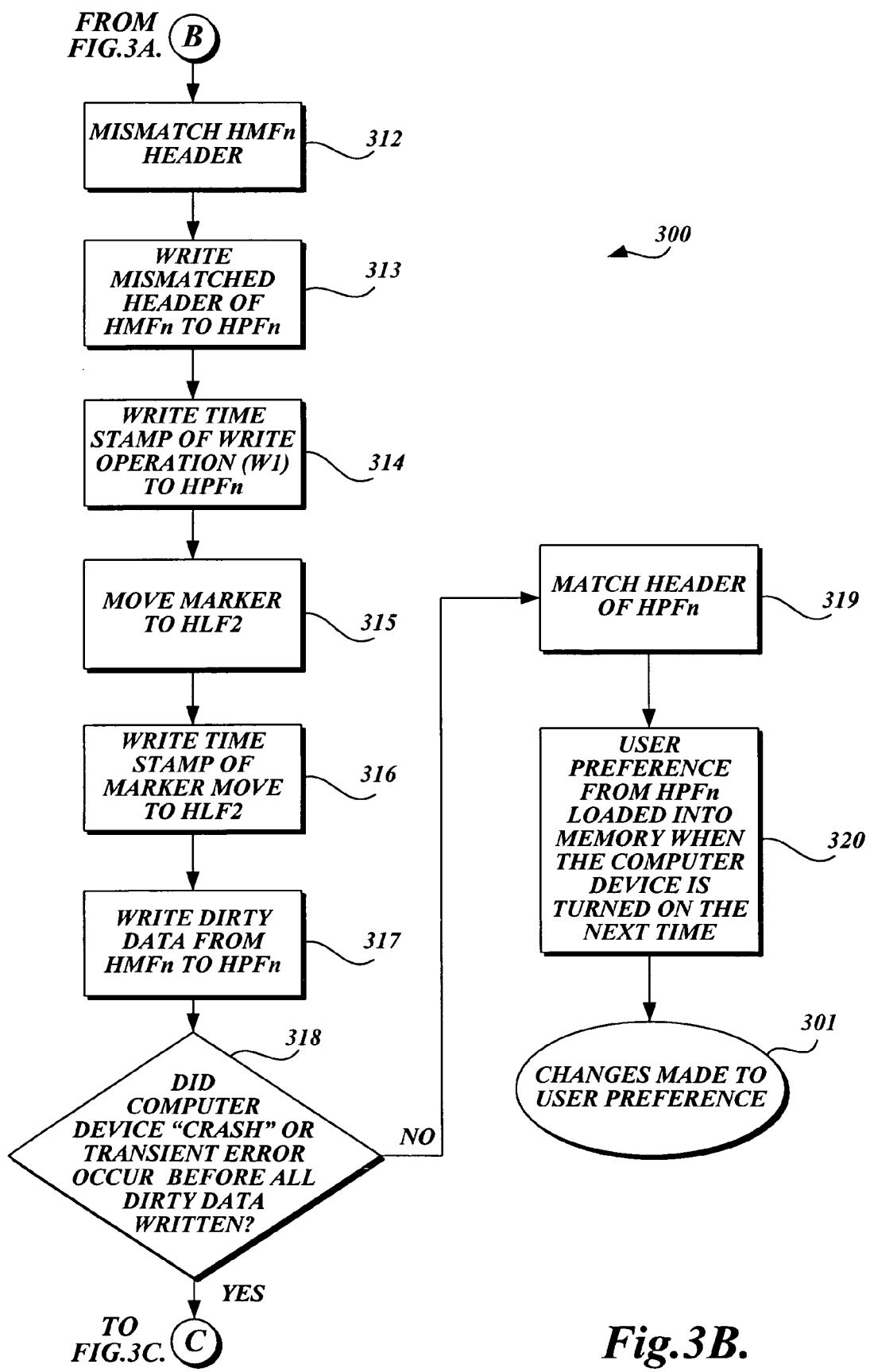

FIG. 4C is a pictorial illustration of the status of an exemplary HPFn 415 and HLF2 422 and the exemplary status of HMFn 400 and HLF1 406 at block 317 of FIG. 3B. HMFn 400 contains a mismatched header section 401 written at block 312 of FIG. 3B (illustrated by "A" and "B" in the two subdivisions of the header section). HPFn 415 includes a mismatched header section 416 written at block 313 in FIG. 3B (illustrated by "A" and "B" in each of the two subdivisions). Illustrated as located below the header section 416 of HPFn 415 is a time stamp section 417. In this example, which corresponds to the sequence of events of FIGS. 3A and 3B, the time stamp section contains the time 10:08 AM, which is the time when the write operation (W1) occurs at block 311 of FIG. 3A. More specifically, 10:08 AM was written in the time stamp section 417 at block 314 of FIG. 3B.

HPFn 415 also includes data sections 418, 419, 420, 421, . . . illustrated as located below the time stamp section 417. Data sections 419 and 421 contain dirty data (illustrated by a sequence of Xs) that corresponds to the dirty data written from data sections 403 and 405 of HMFn 400 at block 317 of FIG. 3B. The contents of HLF1 406 remain the same as at block 310 of FIG. 3A. Marker 407 is set for HLF2 422 at block 315 of FIG. 3B and the time stamp value is written in a time stamp section 424 of HLF2 422 at block 316 of FIG. 3B. In this example, which illustrates the sequence of events of FIGS. 3A and 3B, time stamp section 424 contains the time 10:10 AM, which is the time when the marker was moved (block 315, FIG. 3B). While HLF2 422 contains dirty vector and dirty data sections similar to the sections of HLF1 406, for the sake of simplicity of illustration, all of the other sections of HLF2 422 illustrated in FIG. 4C are shown as blank, the blank sections include blank header section 423, blank dirty vector section 425, and one blank data section 426. In this regard, even though HLF2 422 may contain values in the header section, dirty vector section, and data sections from previous operations, for the sake of simplicity of illustration HLF2 422 is illustrated in FIG. 4C at its minimum capacity. It should also be noted that hive log files such as HLF1 406 and HLF2 422 are deleted after a write operation writes dirty data from the registry hive file such as HMFn 400 to the hive primary file such as HPFn 415 if the computer device does not "crash" or a transient error does not occur before the write operation is completed.

Returning to FIG. 3B at block 318, a check is made to determine if the computer device "crashed" or a transient error occurred before all of the dirty data was written from HMFn to HPFn. If no crash or transient error occurred (the "NO" branch from block 318), at block 319 the header section of HPFn is matched. Next at block 320, since the dirty data is successfully written to HPFn, the user preference from HPFn is loaded into memory when the computer device is turned on the next time. Then the flow cycles back to block 301. Also, as noted above, since the dirty data is successfully written to HPFn, the contents of HLF1 and HLF2 are deleted, i.e., HLF1 and HLF2 are cleared.

Figure 4D:
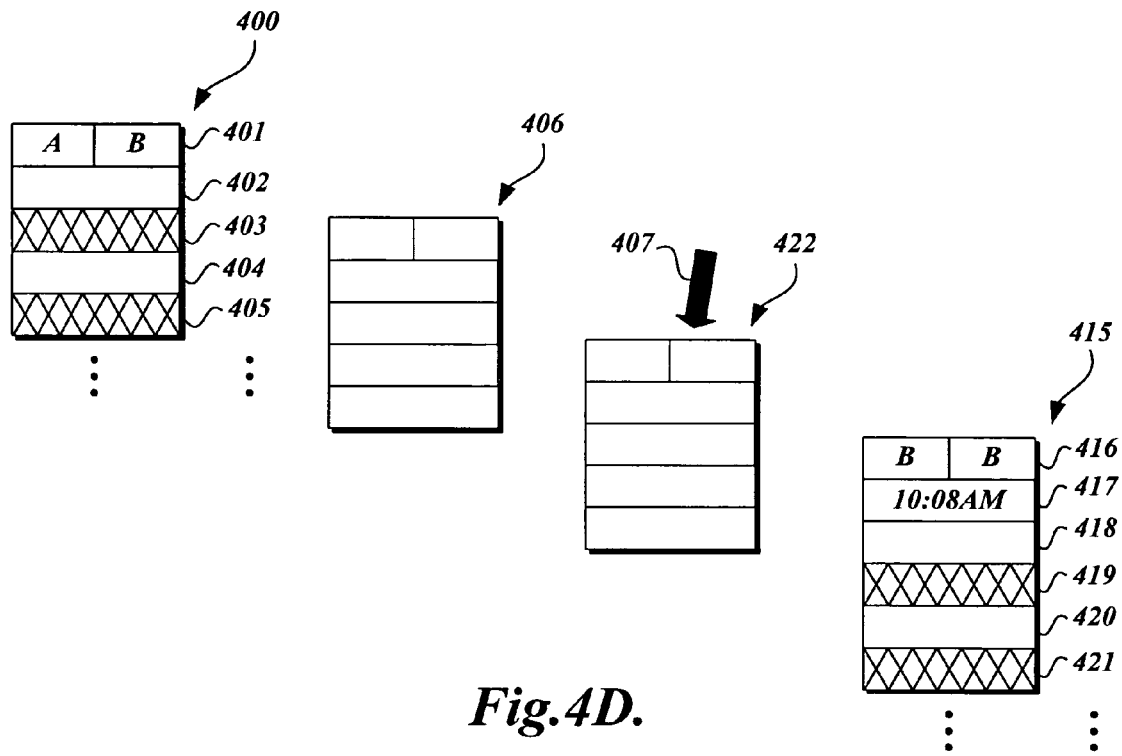
FIG. 4D is a pictorial illustration of the status of the exemplary HMFn, HLF1, HLF2, and HPFn of FIG. 4C at block 320 of FIG. 3B.

FIG. 4D is a pictorial illustration of the status of HMFn 400, HLF1 406, HLF2 422, and HPFn 415 at block 320 of FIG. 3B. The contents of HMFn 400 remain the same as at block 317 of FIG. 3B. HPFn 415 contains the matched header section 416, written at block 319 in FIG. 3B (illustrated by "A" in both subdivisions). Since the contents of HLF1 406 and HLF2 422 have been deleted, HLF1 406 and HLF2 422 are at their minimum capacity. Marker 407 remains set at HLF2 422.

Returning to FIG. 3B, if the computer crashes before all of the dirty data is written from HMFn to HPFn (the "YES IF CRASH" branch of block 318 shown in FIG. 3C), at block 322, the user preference from HLF1 is recovered in memory when the computer device is next turned on. When performing a recovery from a hive log file, both hive log files (HLF1 and HLF2) and hive primary file (HPFn) are loaded into memory when the computer device is turned on the next time. The time stamp value of the hive log files are compared with the time of the "crash" or transient error. Corrections are applied by copying data from the hive log file with a valid time stamp value (the time stamp value of the most recent flush operation before the computer device "crashed" or the transient error occurred) to the appropriate data sections of the hive primary file. By basing the corrections on the time stamp value, construction of a full and correct image of the primary hive file in memory is ensured. The unchanged data from the primary hive file is not written to the hive log file from where the corrections are applied. By way of example, the time stamp of HLF1 406 in FIG. 4C reads 10:05 AM, the time of the last flush operation, and the time stamp of HLF2 422 in FIG. 4C reads 10:10 AM, the time when the marker was moved. Since HLF1 has a valid time stamp, the dirty data in HLF1 is valid, whereby the HLF1 data can be used for recovery when the computer device is turned on the next time.

Returning to FIG. 3C, after block 322, the flow cycles back to block 301. If a transient error occurs before all of the dirty data is written from HMFn to HPFn (the "YES IF TE" branch from block 318), a further check is made at block 321 to determine if HMFn needs flushing (F2). The further check is made to determine if the user has made changes to the user preference that was written to HMFn after the last flush operation at block 303. If the further check fails (the "NO" branch from block 321), there was no more dirty data written to HMFn after the last flush operation. Again, even though the transient error occurred before all of the dirty data was written to HPFn, the dirty data in HLF1 is still valid. If the further check fails, at block 322, the user preference from HLF1 is recovered from memory when the computer device is turned on the next time. Then the flow cycles back to block 301.

Figure 3C:
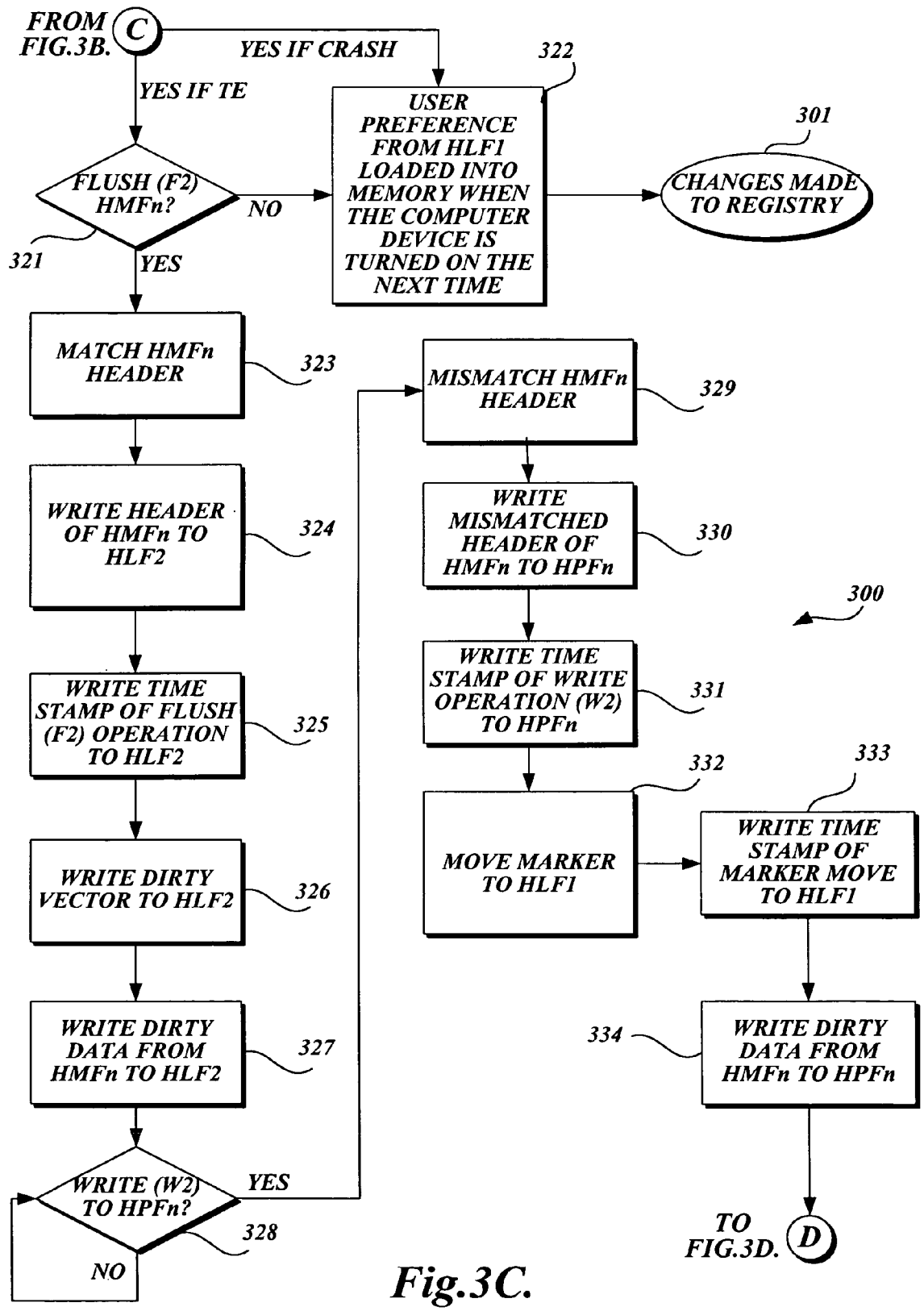
Figure 4E:
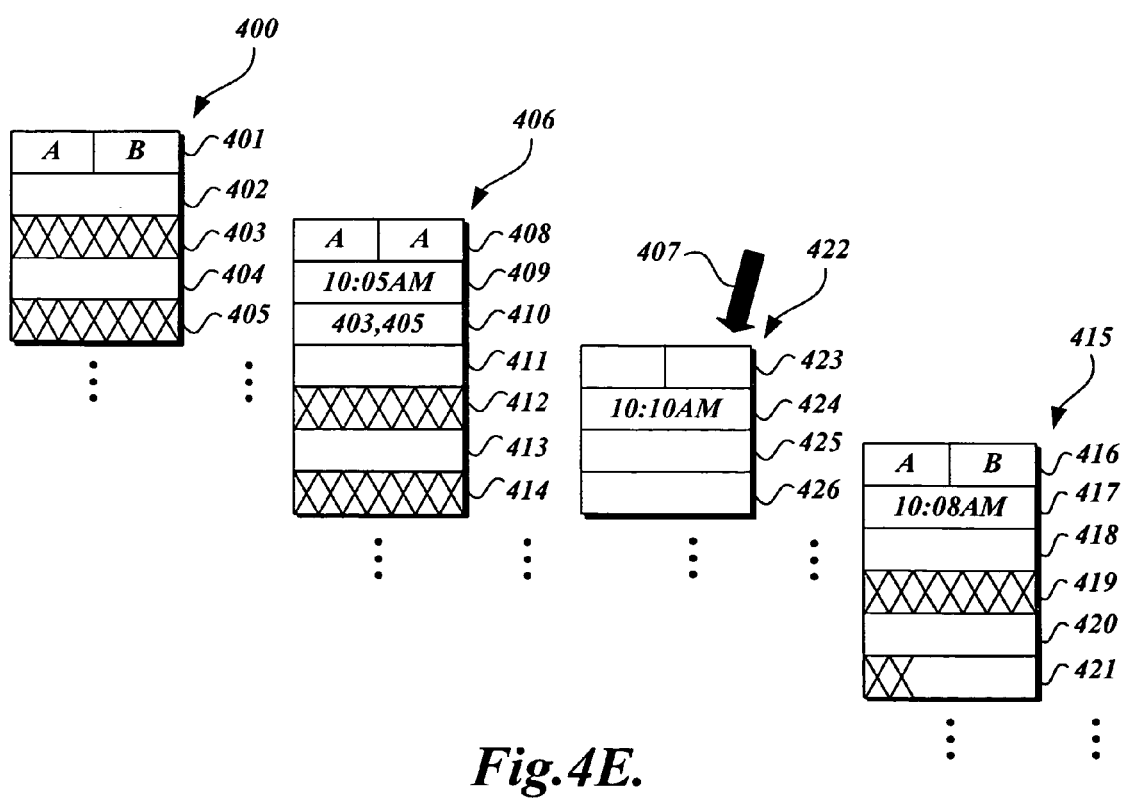
FIG. 4E is a pictorial illustration of the status of the exemplary HMFn, HLF1, HLF2, and HPFn of FIG. 4C at block 322 of FIG. 3C.

FIG. 4E is a pictorial illustration of the status of HMFn 400, HLF1 406, HLF2 422, and HPFn 415 at block 322 in FIG. 3C. HMFn 400, HLF1 406, and HLF2 422 remain the same as at block 317 of FIG. 3B. HPFn 415 contains not only a mismatched header section 416 (illustrated by "A" and "B" in each of the two subdivisions), but also incomplete dirty data (illustrated by a sequence of Xs in data section 421 less than the sequence of Xs in data section 405 of HMFn 400).

Returning to FIG. 3C, if the further check succeeds (the "YES" branch from block 321), at block 323, the header of HMFn is matched. Next, at block 324, the header section of HMFn is written to a header section of HLF2. Then, at block 325, a time stamp of the flush operation (F2) is written to HLF2. The time stamp denotes the time when the flush operation (F2) occurs. Next, at block 326, a dirty vector is written to HLF2. Next, at block 327, the dirty data is written from HMFn to corresponding data sections of HLF2.

Figure 4F:
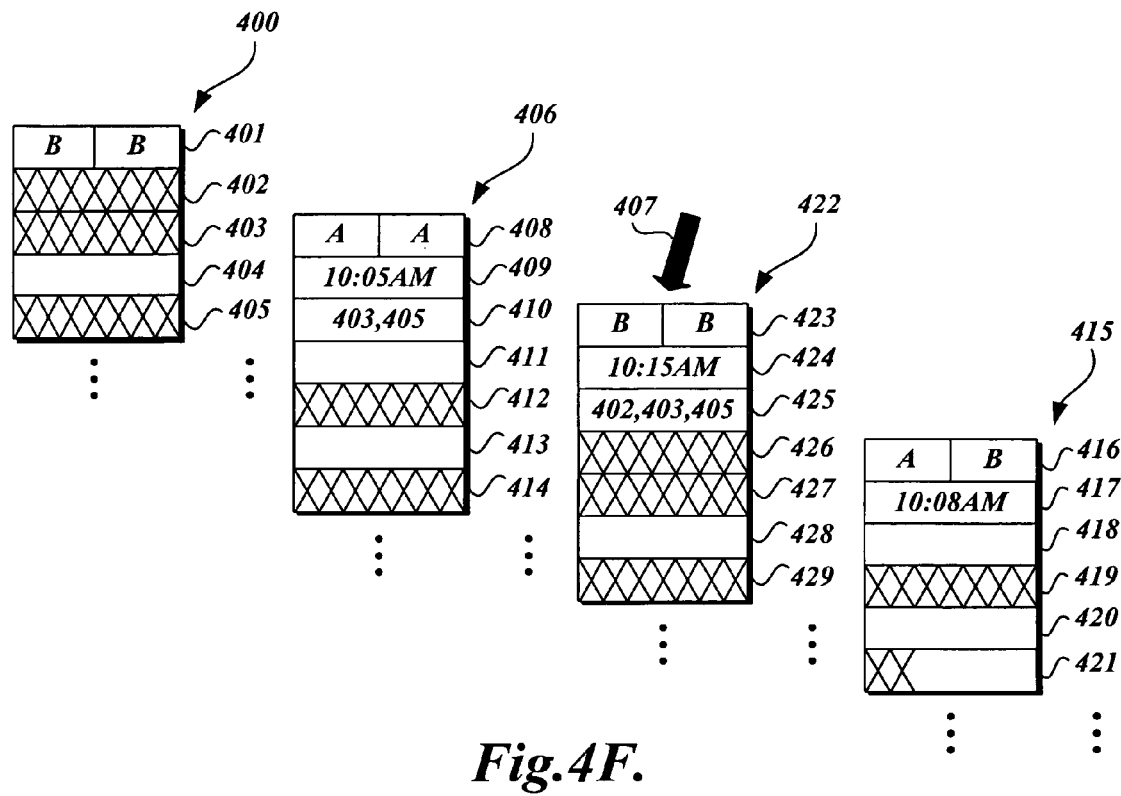
FIG. 4F is a pictorial illustration of the status of the exemplary HMFn, HLF1, and HLF2 of FIG. 4C at block 327 of FIG. 3C.

FIG. 4F is a pictorial illustration of the status of HMFn 400, HLF1 406, and HLF2 422 at block 327 of FIG. 3C, i.e., the status when more dirty data is written to HMFn after the last flush operation. HLF1 and HPFn remain the same as in FIG. 4E above. HMFn has a matched header section written at block 323 in FIG. 3C (illustrated by "A" in both subdivisions). HMFn also has more dirty data written to data section 402 (illustrated by a sequence of "Xs" written before the last flush (F2) operation). Header section 423 of HLF2 (the hive log file with the marker) contains an "A" in each subdivision, written at block 324 in FIG. 3C. Below the header section 423 is the time stamp section 424. In the illustrated example of this sequence of events, the time stamp section contains the time 10:15 AM, which is the time when the flush operation (F2) occurred. 10:15 AM is written in time stamp section 424 at block 325 of FIG. 3C. Illustrated below the time stamp section 424 is a dirty vector 425. Dirty vector 425 contains location information for the dirty data in the data sections of HMFn 400. Comparing HMFn 400 with HLF2 422 reveals that the dirty vector location information for sections 402, 403 and 405, written at block 326 in FIG. 3C, correspond to the locations of the dirty data in data sections 402, 403 and 405 of HMFn 400. HLF2 422 further includes data sections 426, 427, 428, 429, . . . illustrated as below the dirty vector 425. Similar to HMFn 400, the size and number of the data sections of HLF2 422 depend on the amount of dirty data to be written from HMFn 400. Data sections 426, 427, and 429 contain dirty data written from data sections 402, 403 and 405, respectively, of HMFn 400. The dirty data is illustrated by a sequence of "Xs" (written at block 327 of FIG. 3C).

Returning to FIG. 3C, at block 328, a check is made to determine if the dirty data needs to be written (W2) from HMFn to data sections of HPFn. If the check fails (the "NO" branch from block 328), the flow continuously cycles back to block 328 and remains in this loop until the check succeeds. If the check succeeds (the "YES" branch from block 328), at block 329, the header section of HMFn becomes mismatched. Next, at block 330, the mismatched header section of HMFn is written to the header section of HPFn. Then, at block 331, a time stamp of the write operation (W2) is written to HPFn. The time stamp denotes the time when the write operation (W2) occurred. Next, at block 332 the marker is moved to HLF1. Then, at block 333 a time stamp of the marker move is written to HLF1. That is, this time stamp denotes the time when the marker was moved to HLF1 at block 332 of FIG. 3C. Next, at block 334, the dirty data is written from the data sections of the HMFn to corresponding data sections of HPFn.

Figure 4G:
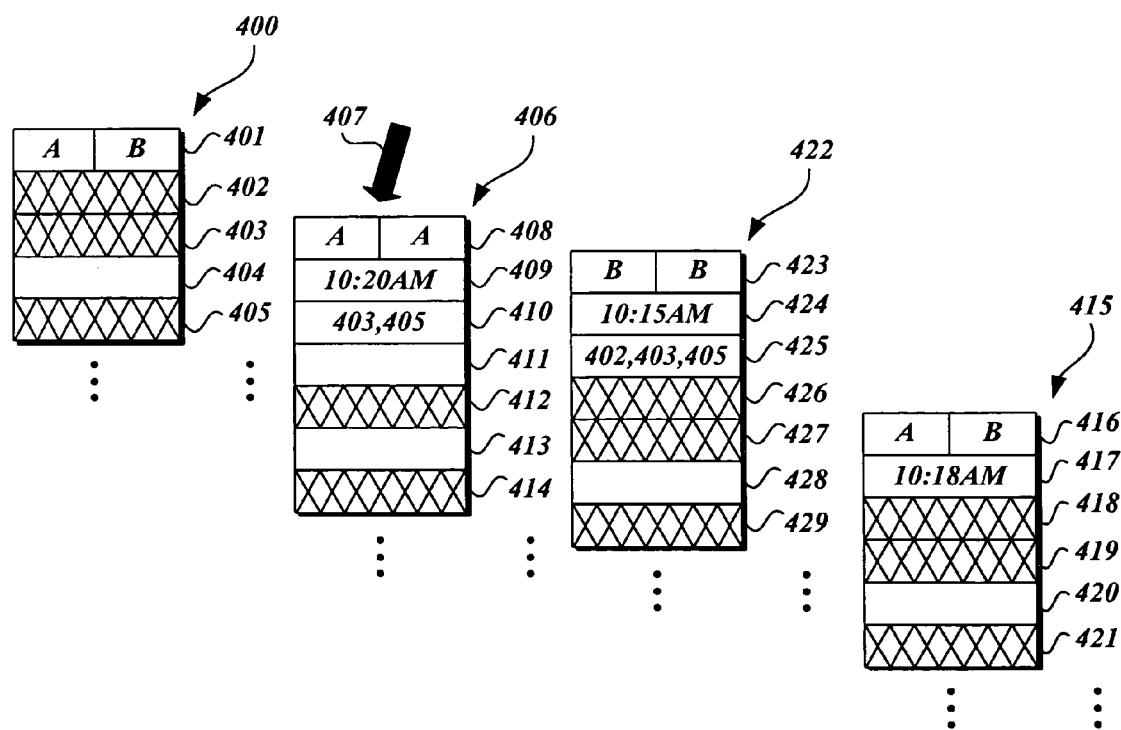
FIG. 4G is a pictorial illustration of the status of the exemplary HMFn, HLF1, HLF2, and HPFn of FIG. 4C at block 334 of FIG. 3C.

FIG. 4G is a pictorial illustration of the status of HMFn 400, HLF1 406, HLF2 422, and HPFn 415 at block 334 of FIG. 3C. HMFn 400 contains a mismatched header section 401 written at block 329 in FIG. 3C (illustrated by "A" and "B" in the two subdivisions). HPFn 415 includes a mismatched header section 416 written at block 330 in FIG. 3C (illustrated by "A" and "B" in each of the two subdivisions). Illustrated as located below the header section 416 of HPFn 415 is the time stamp section 417. In this example of the sequence of events of FIG. 3C, the time stamp section contains the time 10:18 AM, the time when the write operation (W2) occurred. 10:18 AM is written at block 331 of FIG. 3C. HPFn 415 further includes data sections 418, 419, 420, 421, . . . illustrated as located below the time stamp section 417. Data sections 418, 419, and 421 contain dirty data (illustrated by a sequence of Xs) corresponding to the dirty data written from data sections 402, 403, and 405 of HMFn 400 at block 334 in FIG. 3C. The contents of HLF2 422 remain the same as at block 327 of FIG. 3C. Marker 407 is set to HLF1 406 (block 332 of FIG. 3C) and the time stamp is written in a time stamp section 409 which is the time stamp written at block 333 of FIG. 3C. In this example, time stamp section 409 contains 10:20 AM, the time when the marker was moved at block 332 of FIG. 3C.

Figure 3D:
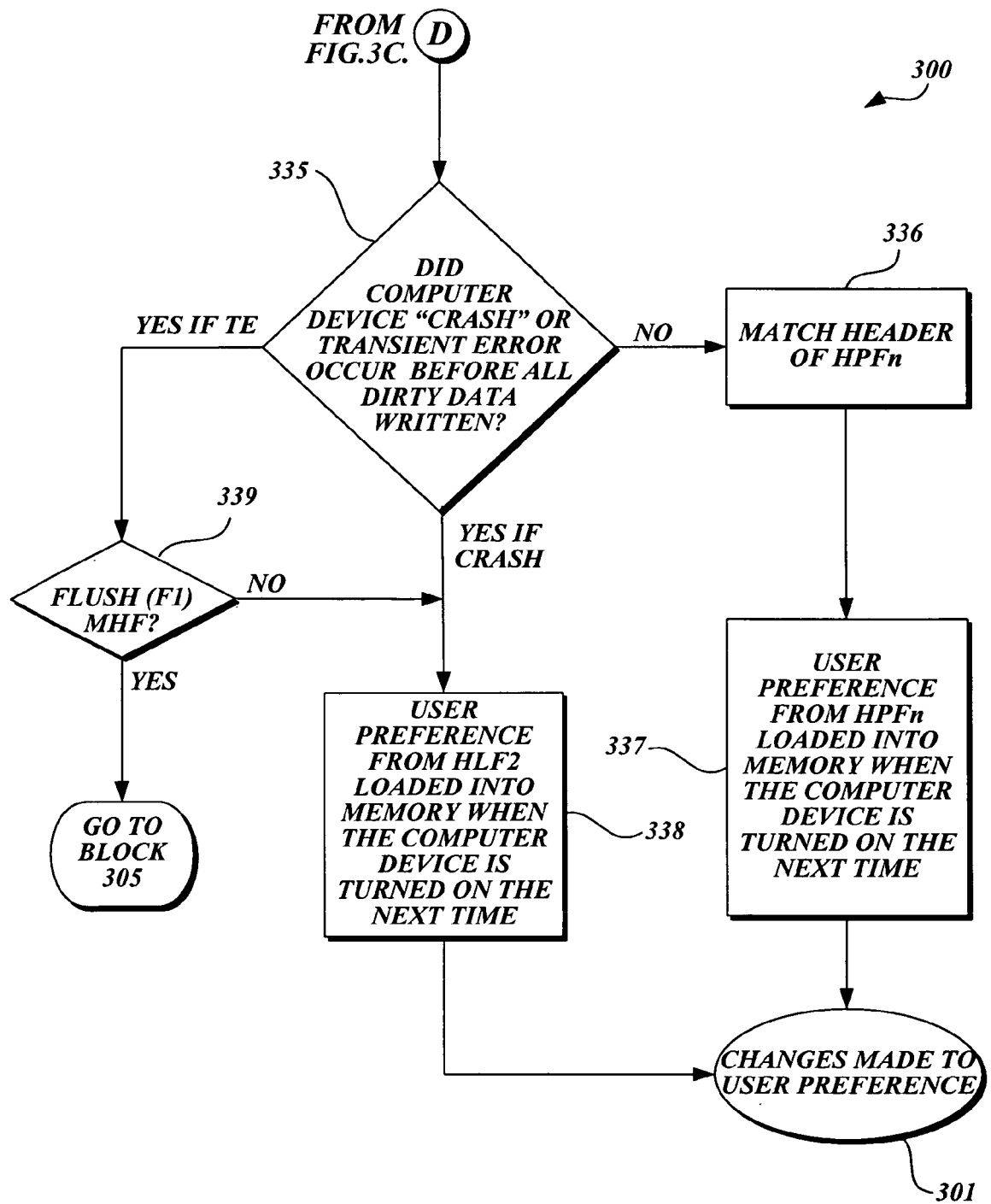

Turning to FIG. 3D, at block 335, a check is made to determine if a crash or a transient error occurred before all of the dirty data was written from HMFn to HPFn. If the computer device did not "crash" or a transient error did not occur before all of the dirty data was written from HMFn to HPFn (the "NO" branch from block 335), at block 336 the header section of HPFn is matched. Next at block 337, since the dirty data was successfully written to HPFn, the user preference from HPFn is loaded into memory when the computer device is turned on the next time. The flow then cycles back to block 301. Also, as noted above, since the dirty data is successfully written to HPFn, the contents of HLF1 and HLF2 are deleted.

Figure 4H:
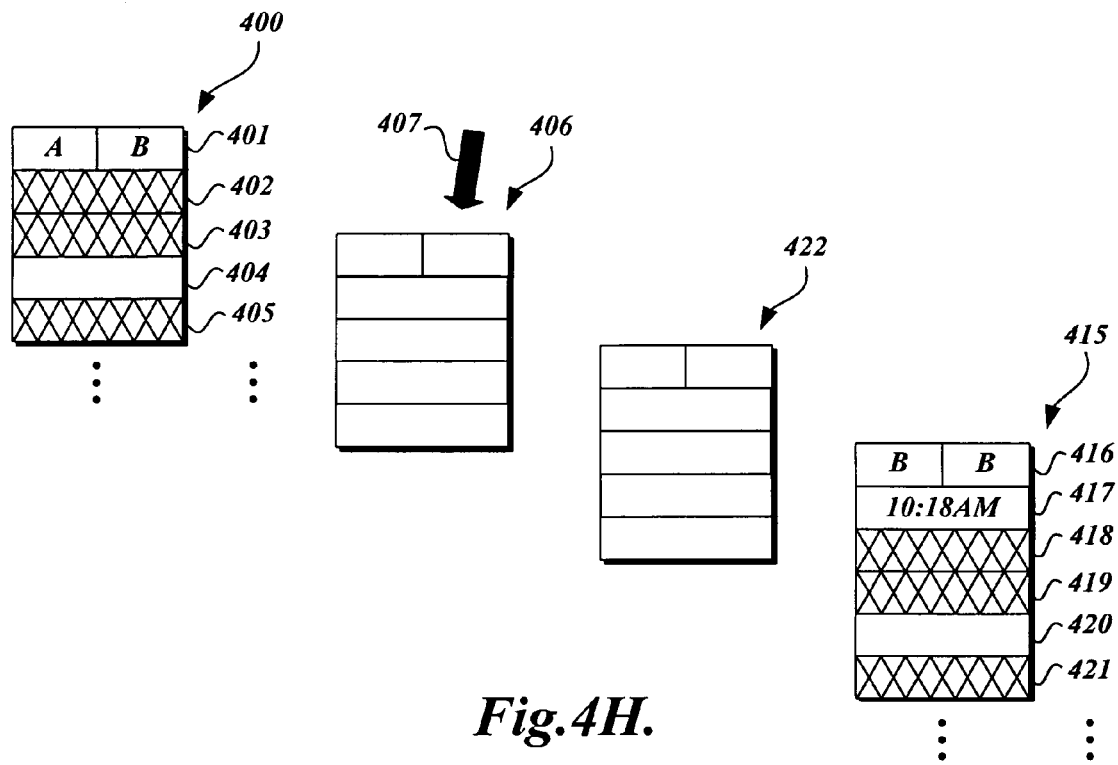
FIG. 4H is a pictorial illustration of the status of the exemplary HMFn, HLF1, HLF2, and HPFn of FIG. 4C at block 337 of FIG. 3D.

FIG. 4H is a pictorial illustration of the status of HMFn 400, HLF1 406, HLF2 422, and HPFn 415 at block 337 of FIG. 3D. The contents of HMFn 400 remain as at block 334 of FIG. 3D. HPFn 415 contains a matched header section 416 written at block 336 in FIG. 3D (illustrated by "A" in both subdivisions). The contents of HLF1 406 and HLF2 422 are deleted, leaving HLF1 406 and HLF2 422 at their minimum capacity. The marker 407 remains set at HLF1 406.

Returning to FIG. 3D, if the computer crashes before all of the dirty data is written from HMFn to HPFn (the "YES IF CRASH" branch from block 335), at block 338, the user preference from HLF2 is recovered in memory when the computer device is turned on the next time. As noted above, when performing a recovery from a hive log file, both hive log files (HLF1 and HLF2) and hive primary file (HPFn) are loaded into memory when the computer device is turned on the next time. The time stamp of the hive log files are compared with the time of the "crash" or transient error. Corrections are applied by copying data from the hive log file with a valid time stamp value (the time stamp value of the most recent flush operation before the computer device "crashed" or the transient error occurred) to the appropriate data sections of the hive primary file. By basing the corrections on the time stamp, construction of a full and correct image of the primary hive file in memory is ensured. The unchanged data from the primary hive file is not written to the hive log file from where the corrections are applied. In this regard, the time stamp value of HLF2 422 of FIG. 4G reads 10:15 AM, the time the last flush operation occurred at block 321 of FIG. 3, and the time stamp value of HLF1 406 of FIG. 4G reads 10:20 AM, the time when the marker was moved. Since HLF2 has a valid time stamp value, the dirty data in HLF2 is valid and recovery from memory can occur when the computer device is turned on the next time.

Returning to FIG. 3D, after blocks 337 or 338, the flow cycles back to block 301. If the transient error occurs before all of the dirty data was written from HMFn to HPFn (the "YES IF TE" branch from block 335), a further check is made at block 339 to determine if HMFn needs flushing (F1). The further check is made to determine if the user has made further changes to the user preference that were written to HMFn after the last flush operation (block 321). If the further check fails (the "NO" branch from block 339), no more dirty data was written to HMFn after the last flush operation. In this situation, even though the transient error occurred before all of the dirty data was written to HPFn, the dirty data in HLF2 is valid. If the further check fails, the flow cycles to block 338 where the user preference from HLF2 is recovered from memory when the computer device is turned on the next time. Then, as before, the flow cycles back to block 301.

Figure 4I:
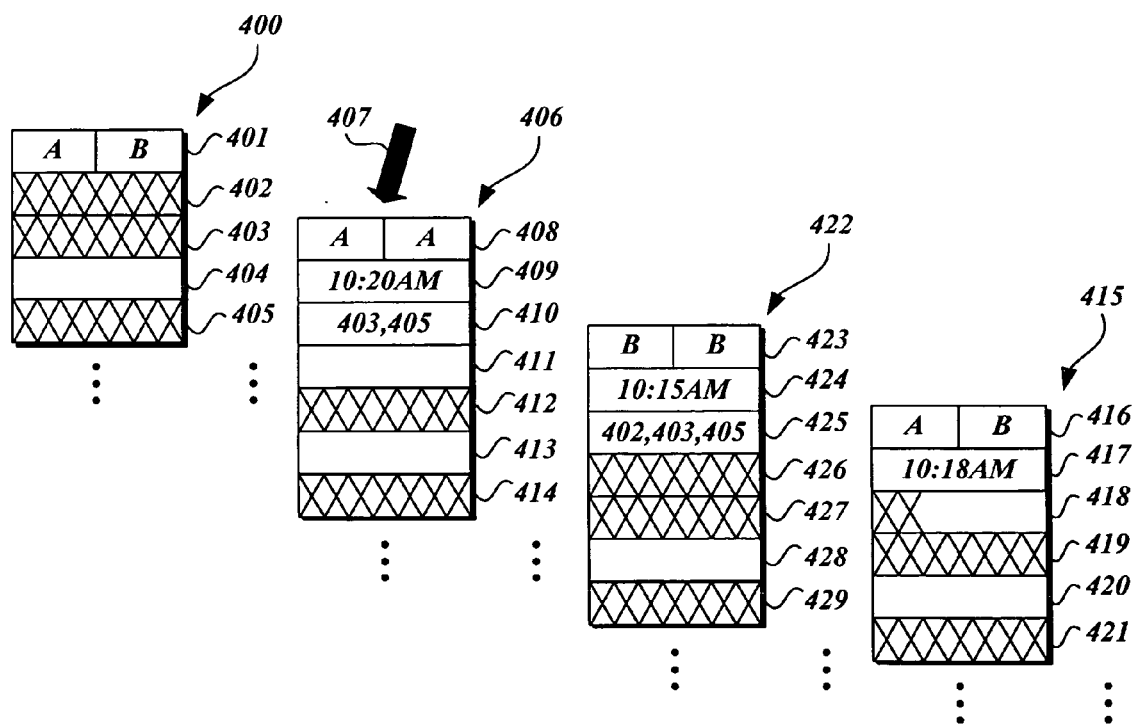
FIG. 4I is a pictorial illustration of the status of the exemplary HMFn, HLF1, HLF2, and HPFn of FIG. 4C at block 338 of FIG. 3D.

FIG. 4I is a pictorial illustration of the status of HMFn 400, HLF1 406, HLF2 422, and HPFn 415 at block 338 in FIG. 3D if the further check fails or if the computer device "crashes" before all of the dirty data is written to HPFn 415. HMFn 400, HLF1 406, and HLF2 422 remain the same as at block 334 of FIG. 3C. HPFn 415 contains not only a mismatched header section 416 (illustrated by "A" and "B" in each of the two subdivisions), but also incomplete dirty data (illustrated by a sequence of Xs in data section 418 less than the sequence of Xs in data section 402 of HMFn 400).

Returning to FIG. 3D, if the further check succeeds (the "YES" branch from block 339), the flow cycles back to block 305.

While an illustrative embodiment has been illustrated and described, it will be appreciated that various changes can be made therein without departing from the spirit and scope of the disclosed subject matter. Thus, while a preferred embodiment of the computer device for logging user preference is described herein, it is to be understood that the embodiment is not limited to the described computer device but rather by the following claims and their full scope of equivalents. In this regard, it is also to be understood that the pictorial diagrams and the description of sections being "below" other sections is for illustration only and does not describe any limiting physical relationship.

The embodiments of the disclosed subject matter in which an exclusive property or privilege is claimed are defined as follows:

1. A computer device for logging changes made to a user preference, wherein the computer device includes a processor and comprises:
   a configuration file in a short term memory to write changes made to the user preference;
   in response to a flush operation, writing the changes made to the user preference from the configuration file in the short term memory to a log file of a pair of log files in a long term memory, the flush operation including an identification operation that sets a marker that identifies the log file of the pair of log files, wherein each log file of the pair of log files in the long term memory comprises a header section divided into two subdivisions, each subdivision containing an identifier, and a time stamp section containing a time when either the identification operation or a flush operation occurred, a dirty vector section containing information that identifies the location of the changes made to the user preference written to the configuration file in the short term memory, a plurality of data sections, each data section containing the changes made to the user preference written from corresponding data sections of the configuration file in the short term memory; and
   in response to a write operation after a completion of the flush operation, writing the change made to the user preference from the configuration file in the short term memory to a configuration file in the long term memory.

2. A computer device for logging changes made to the user preference as claimed in claim 1 wherein the configuration file in the short term memory comprises:
   a header section divided into two subdivisions, each subdivision containing an identifier; and
   a plurality of data sections, each data section containing the changes made to the user preference written to the configuration file in the short term memory.

3. A computer device for logging changes made to the user preference as claimed in claim 1 wherein the configuration file in the long term memory comprises:
   a header section divided into two subdivisions, each subdivision containing an identifier;
   a time stamp section containing the time of a write operation; and
   a plurality of data sections, each data section containing the changes made to the user preference written from corresponding data sections of the configuration file in the short term memory.

4. A method for logging changes made to a user preference in a computer device, comprising:
   writing the changes made to the user preference into a configuration file in a short term memory of the computer device;
   in response to a first flush operation, writing the changes made to the user preference from the configuration file in the short term memory of the computer device to a log file of a pair of log files in a long term memory of the computer device, wherein each log file of the pair of log files in the long term memory comprises a header section divided into two subdivisions, each subdivision containing an identifier, and a time stamp section containing a time when either the identification operation or a flush operation occurred, a dirty vector section containing information that identifies the location of the changes made to the user preference written to the configuration file in the short term memory, a plurality of data sections, each data section containing the changes made to the user preference written from corresponding data sections of the configuration file in the short term memory; and
   in response to a first write operation after the completion of the first flush operation, writing the changes made to the user preference from the configuration file in the short term memory of the computer device to a configuration file in the long term memory of the computer device.

5. A method for logging changes made to the user preference as claimed in claim 4 wherein writing the changes made to the user preference in the configuration file in the short term memory of the computer device further comprising:
   writing a same identifier to both subdivisions of a pair of subdivisions of a header section of the configuration file in the short term memory followed by writing the changes made to the user preference in one or more data sections of the configuration file in the short term memory.

6. A method for logging changes made to the user preference as claimed in claim 5 wherein writing the changes made to the user preference from the configuration file in the short term memory of the computer device to the log file of the pair of log files further comprising:
   matching the identifiers in both subdivisions of the pair of subdivisions of the header section of the configuration file in the short term memory;
   after matching the identifiers, identifying the log file of the pair of log files by setting a marker associated with the log file;
   after setting the marker, writing the identifiers in both subdivisions of a pair of subdivisions of a header section of the log file of the pair of log files that match the identifiers in both subdivisions of the pair of subdivisions of the header section of the configuration file in the short term memory;
   after writing the identifiers to both subdivisions of the pair of subdivisions of the header section of the log file of the pair of log files, writing a time of the first flush operation in a time stamp section of the log file of the pair of log files;
   after writing the time of the first flush operation, writing information identifying a location of the changes to the user preference written in one or more data sections of the configuration file in the short term memory in a dirty vector section of the log file of the pair of log files; and
   after writing the information identifying the location of the changes, writing the changes made to the user preference from the configuration file in the short term memory to one or more data sections of the log file of the pair of log files, the one or more data sections corresponding to the data sections of the configuration file in the short term memory where changes made to the user preference are written.

7. A method for logging changes made to the user preference as claimed in claim 6 wherein writing the changes made to the user preference from the configuration file in the short term memory of the computer device to the configuration file in the long term memory of the computer device further comprising:

mismatching the identifiers in both subdivisions of the pair of subdivisions of the header section of the configuration file in the short term memory;

after mismatching the identifiers, writing the identifiers in both subdivisions of a pair of subdivisions of a header section of the configuration file in the long term memory to match the mismatched identifiers in both subdivisions of the pair of subdivisions of the header section of the configuration file in the short term memory;

after writing the mismatched identifiers in both subdivisions of the pair of subdivisions of the header section of the configuration file in the long term memory, writing a time of the first write operation in a time stamp section of the configuration file in the long term memory;

after writing the time of the first write operation, identifying another log file of the pair of log files on the hard disk by setting the marker from the log file of the pair of log files to the other log file of the pair of tog files;

after setting the marker, writing a time of setting the marker in a time stamp section of the other log file of the pair of log files; and after writing the time of setting the marker, writing the changes made to the user preference from the configuration file in the short term memory to one or more data sections of the configuration file in the long term memory, the one or more data sections corresponding to the data sections of the configuration file in the short term memory where changes made to the user preference are written.

8. A method for logging changes made to the user preference as claimed in claim 7 wherein if the computer device does not crash or a transient error does not occur before the changes made to the user preference are written from the configuration file in the short term memory to the configuration file in the long term memory, the method further comprising:

matching the identifiers in both subdivisions of the pair of subdivisions of the header section of the configuration file in the long term memory; and loading the changes made to the user preference from the configuration file in the long term memory into short term memory when the computer device is turned on a next time.

9. A method for logging changes made to the user preference as claimed in claim 7 wherein if the computer device crashes before the changes made to the user preference are written from the configuration file in the short term memory to the configuration file in the long term memory, the method further comprising:

loading the changes made to the user preference from the log file of the pair of log files into short term memory when the computer device is turned on a next time.

10. A method for logging changes made to the user preference as claimed in claim 7 wherein if a first transient error occurs before the changes made to the user preference are written from the configuration file in the short term memory to the configuration file in the long term memory, the method further comprising:

if a second flush operation does not occur after the first transient error, loading the changes made to the user preference from the log file of the pair of log files into short term memory when the computer device is turned on a next time; and if the second flush operation occurs after the first transient error:

matching the identifiers of the pair of subdivisions of the header section of the configuration file in short term memory;

after matching the identifiers, writing the identifiers in both subdivisions of a pair of subdivisions of a header section of the other log file of the pair of log files that match the identifier in the subdivisions of the header section of the configuration file in the short term memory;

after writing the identifier to the pair of subdivisions of the header section of the other log file of the pair of log files, writing a time of the second flush operation in a time stamp section of the other log file of the pair of log files;

after writing the time of the second flush operation, writing information identifying a location of the changes to the user preference written in one or more data sections of the configuration file in short term memory in a dirty vector section of the other log file of the pair of log files; and after writing the location information, writing the changes made to the user preference from the configuration file in short term memory to one or more data sections of the other log file of the pair of log files, the one or more data sections corresponding to the data sections of the configuration file in short term memory where changes made to the user preference are written.

11. A method for logging changes made to the user preference as claimed in claim 10 wherein if the second flush operation occurs after the first transient error and a second write operation follows the first transient error, the method further comprising:

mismatching the identifiers of the pair of subdivisions of the header section of the configuration file in short term memory;

after mismatching the identifiers, writing the identifiers in both subdivisions of the pair of subdivisions of the header section of the configuration file in the long term memory to match the mismatched identifiers of the pair of subdivisions of the header section of the configuration file in short term memory;

after writing the mismatched identifiers in the pair of subdivisions of the header section of the configuration file in the long term memory, writing a lime of the second write operation in the time stamp section of the configuration file in the long term memory;

after writing the time of the second write operation, re-identifying the log file of the pair of log files in the long term memory by setting the marker from the other log file of the pair of log files to the log file of the pair of log files;

after re-identifying the log file, writing a time of setting the marker in the time stamp section of the log file of the pair of log files; and after writing the time of setting the marker, writing the changes made to the user preference from the configuration file in the short term memory to one or more data sections of the configuration file in the long term memory, the one or more data sections corresponding to the data sections of the configuration file in the short term memory where changes made to the user preference are written.

12. A method for logging changes made to the user preference as claimed in claim 11 wherein if the computer device does not crash or a second transient error does not occur before the changes made to the user preference are written from the configuration file in the short term memory to the configuration file in the long term memory, the method further comprising:

matching the identifiers of the pair of subdivisions of the header section of the configuration file in long term memory; and loading the changes made to the user preference from the configuration file in the long term memory into short term memory when the computer device is turned on a next time.

13. A method for logging changes made to the user preference as claimed in claim 11 wherein if the computer device crashes before the changes made to the user preference are written from the configuration file in the short term memory to the configuration file in the long term memory, the method further comprising:

loading the changes made to the user preference from the other log file of the pair of log files into short term memory when the computer device is turned on a next time.

14. A method for logging changes made to the user preference as claimed in claim 12 wherein if the second transient error occurs before the changes made to the user preference are written from the configuration file in the short term memory to the configuration file in the long term memory, the method further comprising:

if a third flush operation does not occur after the second transient error, loading the changes made to the user preference from the other log file of the pair of log files into short term memory when the computer device is turned on a next time.

15. A method for logging changes made to a user preference in a computer device, comprising:

writing the changes made to the user preference in a registry hive file in a short term memory of the computer device;

in response to a flush operation, writing the changes made to the user preference from the registry hive file in the short term memory of the computer device to a hive log file of a pair of hive log files in a long term memory of the computer device, wherein the hive log file is identified by setting a marker associated with the hive log file before writing the changes, wherein each hive log file of the pair of hive log files in the long term memory comprises a header section divided into two subdivisions, each subdivision containing an identifier, and a time stamp section containing a time when either the identification operation or a flush operation occurred, a dirty vector section containing information that identifies the location of the changes made to the user preference written to the configuration file in the short term memory, a plurality of data sections, each data section containing the changes made to the user preference written from corresponding data sections of the configuration file in the short term memory; and in response to a write operation after the completion of the flush operation, (i) setting the marker from the hive log file of the pair of hive log files to another hive log file of the pair of hive log files in the long term memory; and (ii) writing the changes made to the user preference from the registry hive file in the short term memory of the computer device to a hive primary file in the long term memory of the computer device.

16. A method for logging changes made to a user preference as claimed in claim 15 wherein if the changes made to the user preference are written from the registry hive file to the hive primary file, loading the changes written to the hive primary file into short term memory when the computer device is turned on a next time.

17. A method for logging changes made to a user preference as claimed in claim 15 wherein if the computer device crashes before the changes made to the user preference are written from the registry hive file to the hive primary file, loading the changes written to the hive log file of the pair of hive log files into short term memory when the computer device is turned on a next time.

18. A method of logging changes made to a user preference as claimed in claim 15 wherein if a transient error occurs and there are no more changes made to the user preference after the transient error occurs, loading the changes written to the hive log file of the pair of hive log files into short term memory when the computer device is turned on a next time.

19. A method of logging changes made to a user preference as claimed in claim 18 wherein if the transient error occurs and there are more changes made to the user preference after the transient error occurs, (i) flushing the changes made to the user preference after the transient error from the registry hive file to the other hive log file of the pair of hive log files; (ii) setting the marker from the other hive log file of the pair of hive log files to the hive log file of the pair of hive log files; (iii) writing the changes from the registry hive file to the other hive log file of the pair of hive log files; and (iv) loading the changes written to the other hive log file of the pair of hive log files into short term memory when the computer device is turned on a next time.

* * * * *

UNITED STATES PATENT AND TRADEMARK OFFICE
CERTIFICATE OF CORRECTION

| | | |
|---|---|---|
| PATENT NO. | : 7,624,129 B2 | Page 1 of 1 |
| APPLICATION NO. | : 11/480628 | |
| DATED | : November 24, 2009 | |
| INVENTOR(S) | : Kenneth M. Jung et al. | |

It is certified that error appears in the above-identified patent and that said Letters Patent is hereby corrected as shown below:

In column 15, line 19, in Claim 7, delete "tog" and insert -- log --, therefor.

In column 16, line 45, in Claim 11, delete "lime" and insert -- time --, therefor.

Signed and Sealed this
Seventeenth Day of May, 2011

David J. Kappos
*Director of the United States Patent and Trademark Office*